UNITED STATES PATENT OFFICE.

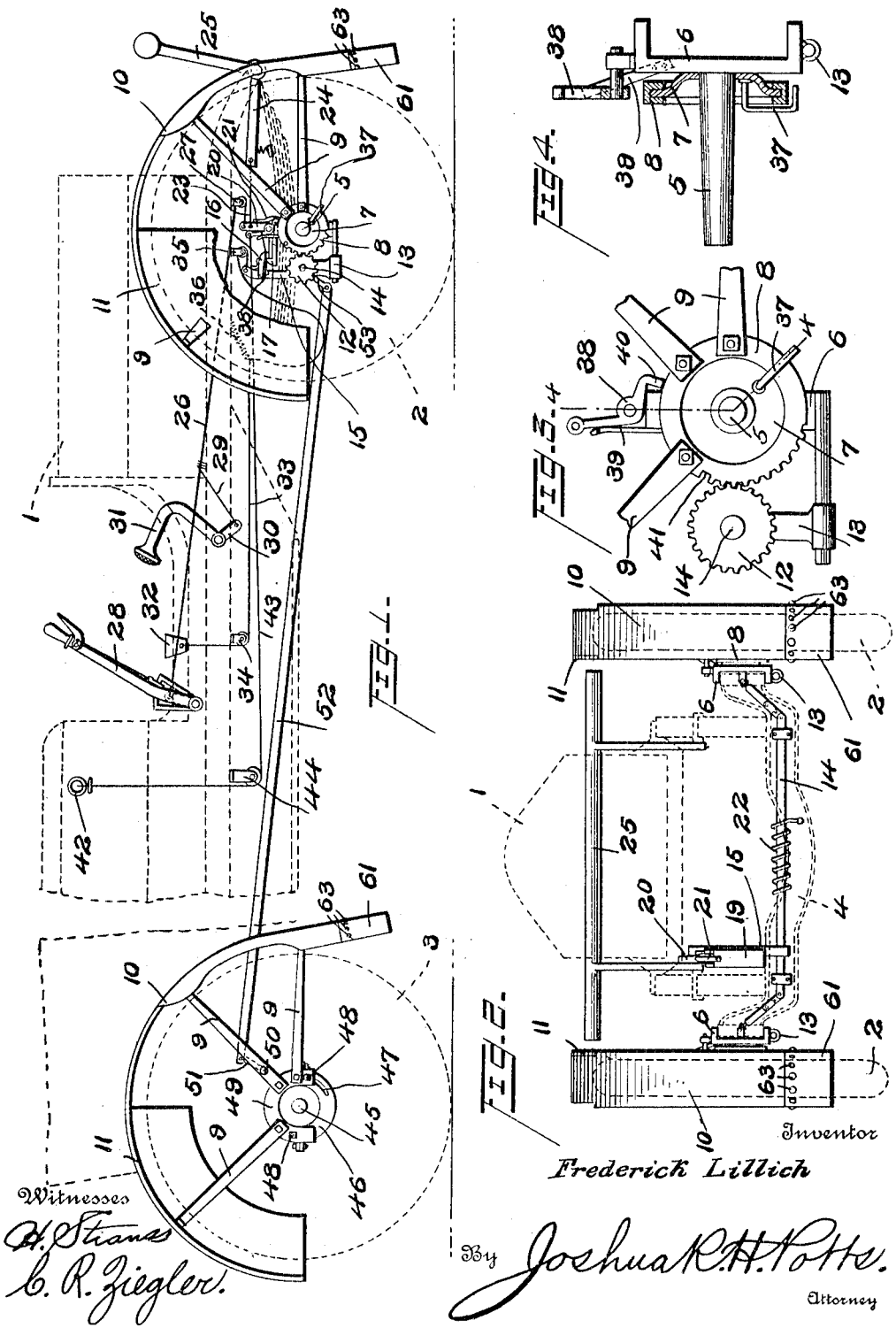

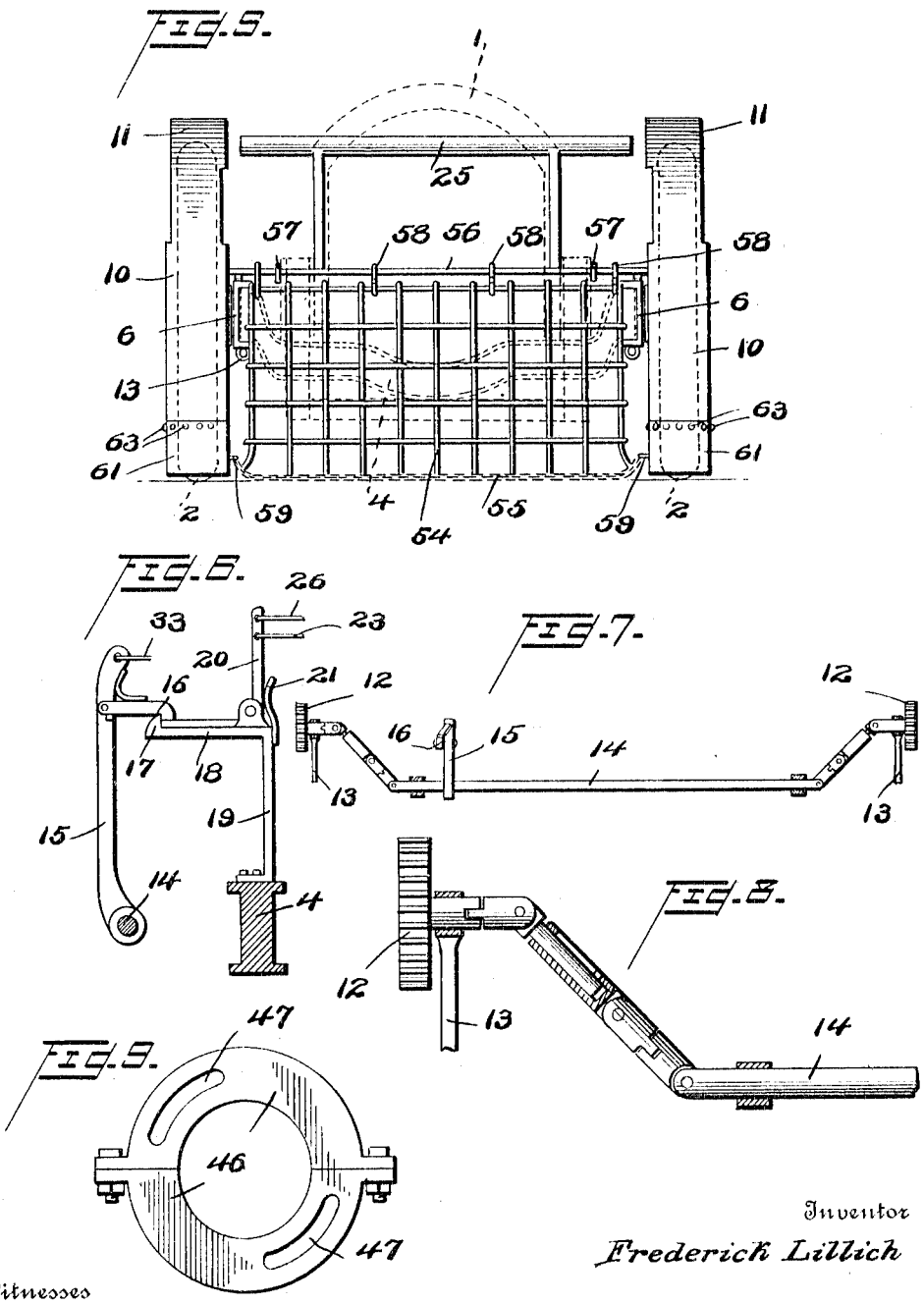

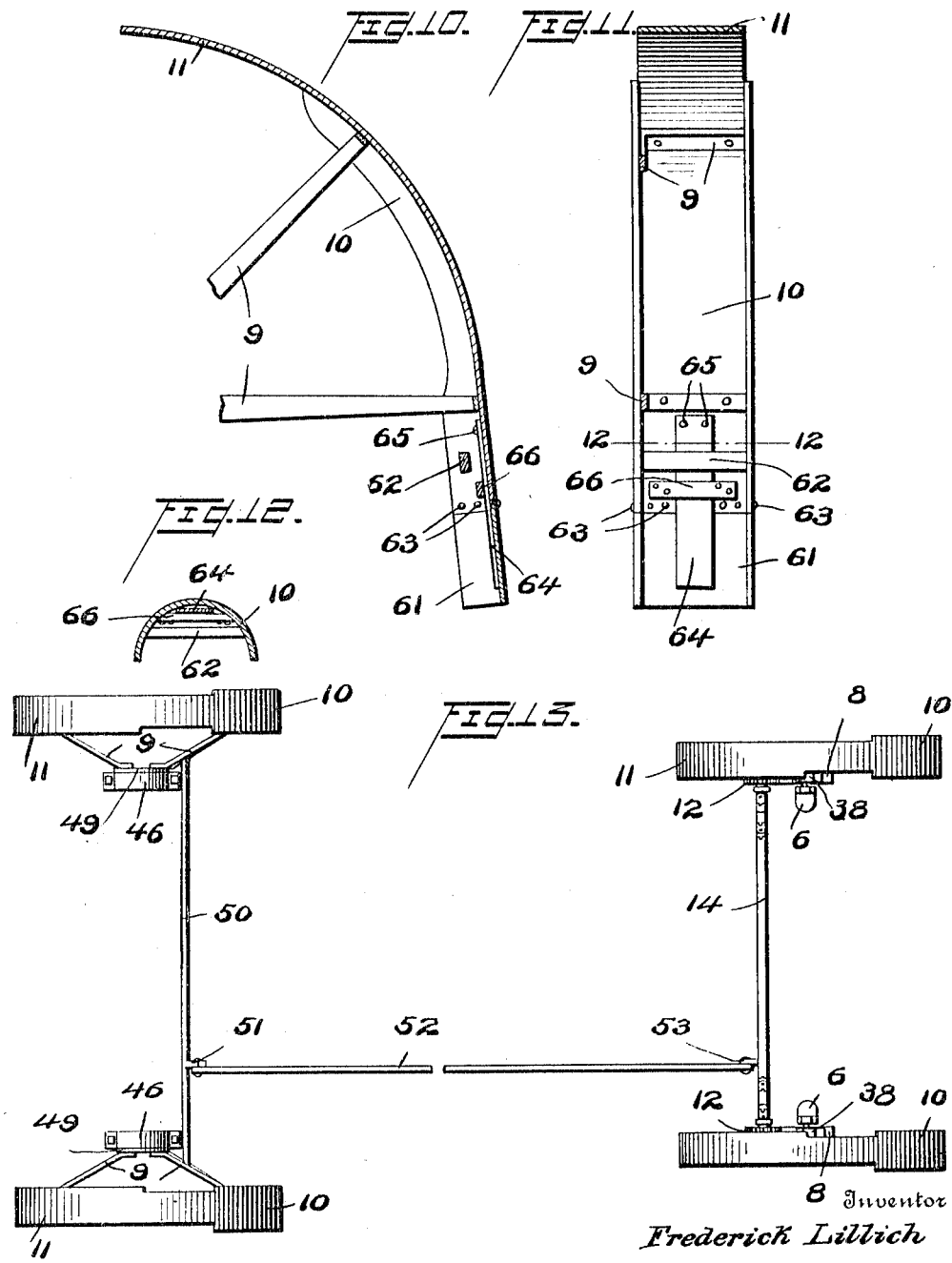

FREDERICK LILLICH, OF PHILADELPHIA, PENNSYLVANIA.

WHEEL-FENDER.

1,117,409.  Specification of Letters Patent.  Patented Nov. 17, 1914.

Application filed December 20, 1913. Serial No. 807,836.

*To all whom it may concern:*

Be it known that I, FREDERICK LILLICH, a citizen of the United States, residing at Philadelphia, in the county of Philadelphia and State of Pennsylvania, have invented certain new and useful Improvements in Wheel-Fenders, of which the following is a specification.

My invention relates to improvements in wheel fenders, the object of the invention being to provide an improved construction and arrangement of fenders for the wheels of vehicles and primarily for use on automobiles, the said fenders so connected as to compel their simultaneous operation.

A further object is to provide an automobile or other similar vehicle with fenders for all of the wheels, and so connect the fenders as to compel them to operate together, providing improved means for holding the fenders in normal elevated position, yet permitting them to fall when desired, furthermore limiting the downward movement of the fenders and locking them in their lowered position to prevent them from being forced upwardly by contact with a person or object.

A further object is to provide an improved construction of wheel fender having an elastic portion at its lower end maintained in normal position by the action of a spring, yet capable of sufficient elasticity to prevent breaking or injury.

A further object is to provide an improved construction of combined fender and mud guard with an improved arrangement of netting connecting the fenders of the front or steering wheels, permitting the latter free movement in any direction, and always in position for use.

With these and other objects in view, the invention consists in certain novel features of construction and combinations and arrangements of parts as will be more fully hereinafter described and pointed out in the claims.

In the accompanying drawings: Figure 1 is a view in side elevation showing my improved wheel fenders in position on an automobile, the latter illustrated in dotted lines. Fig. 2 is an end view showing a front elevation of the fenders for the front wheels in their normal raised position. Fig. 3 is an enlarged fragmentary elevation illustrating the fender supporting gear and its operating pinion. Fig. 4 is a view in section on the line 4—4 of Fig. 3. Fig. 5 is a view similar to Fig. 2 but illustrating the fenders in their lowered position and connected by a rope netting constituting a scoop fender. Fig. 6 is an enlarged view in section illustrating the tripping mechanism of the fenders. Fig. 7 is a view in elevation of the fender operating shaft. Fig. 8 is an enlarged view partly in elevation and partly in section illustrating one flexible end of this shaft and its pinion connection. Fig. 9 is an enlarged view in elevation illustrating one of the disks providing rotary mounting for the fenders of the rear wheels. Fig. 10 is a fragmentary view in longitudinal section on an enlarged scale illustrating one of the wheel fenders. Fig. 11 is a view in rear elevation of one of the wheel fenders showing the mud guard in cross section. Fig. 12 is a view in section on the line 12—12 of Fig. 11, and Fig. 13 is a plan view illustrating my improved arrangement of wheel fenders.

1 represents an automobile or other vehicle having front wheels 2, and rear wheels 3. In the manufacture of a certain type of automobiles, it is customary to extend the rear wheels laterally, so that the rear wheels have a broader gage than the front wheels as indicated in Fig. 13, and while my improvements are adapted for use in connection with any vehicle, they are especially adapted for use on a vehicle of this kind, as they prevent the rear as well as the front wheels from running over a person or object. The front axle 4 of the vehicle is provided with the ordinary axle stubs 5 which are integral with the brackets 6, and to the latter disks 7 are secured. The edges of the disks 7 are off set as shown clearly in Fig. 4, and said disks constitute rotary mountings for gears 8. The gears 8 are connected by spokes 9 with fenders 10, so that the fenders move when the gears move or vice versa. The fenders 10 are connected to and form continuations or rearwardly extending mud guards 11 so as to form the double function of a fender and mud guard. To operate the fenders, or rather to compel them to elevate, I provide pinions 12 which mesh with the gears 8 and are held in mesh by brackets 13.

The pinions 12 are turned by means of a flexible shaft 14, and the latter has an upwardly projecting crank arm 15 carrying a spring-pressed catch 16 adapted to engage over a beveled enlargement 17 on an arm 18. The arm 18 is fixed to a bracket 19 secured to axle 4. An angle lever 20 is pivotally supported on the arm 18, and at one end lies below the free end of catch 16, and a spring 21 holds the angle lever in normal position. When this lever 20 is operated, the catch 16 will be released, and the fenders permitted to fall, which movement is insured by a coiled spring 22 located around said shaft 14 and secured at one end to axle 4.

The vertical member of the angle lever 20 is connected by a flexible device 23 with a crank arm 24 on a pivoted bumper 25, so that when the bumper engages a person or object, the fenders will fall. A second flexible device 26 is secured to the vertical member of lever 20, extends forwardly a short distance, and is passed around a pulley 27 fixed to the vehicle frame. The flexible device then extends rearwardly and is attached to a brake lever 28. The flexible device 26 is also connected by a flexible device 29 with a crank arm 30 on a fender releasing lever 31, so that when either of these levers are operated, the fender will be permitted to fall. To bring the fenders back to normal position, I provide a pull 32 which is located in convenient reach of the operator. This pull is connected by a flexible device 33 with the upper end of crank arm 15, the said flexible device 33 is passed under a pulley 34 secured to the vehicle frame and over a pulley 35, the latter being secured to the vehicle frame in advance of arm 15, so that by the operation of the pull, the arm 15 receives a forward motion.

In order that the arm may be swung to let the fenders drop, it is necessary to provide slack in the flexible device 33, and this slack is confined to the forward portion of the flexible device by reason of a coiled spring 36 which connects the flexible device 33 with the vehicle frame as clearly shown in Fig. 1.

To limit the downward movement of the fenders, I provide fixed fingers 37 on the disks 7, which are engaged by the forward spokes 9, and to lock the fenders in their lowered position I provide a pivoted catch 38. This catch 38 is supported on the upper portion of a bracket 6, and has a spring 39 which presses a lug 40 against the outer faces of a segmental gear 8. When this gear turns, as the fender lowers, a notch 41 will move into position so that the lug 40 will spring into locked engagement therewith, and prevent any possibility of the fenders being forced upwardly by contact with the person or object.

To release the fenders, and allow them to be elevated, I provide a pull 42 which is connected by a flexible device 43 with the catches 38, said flexible device 43 passed around a pulley 44 on the vehicle frame.

On the rear axle 45, I secure sectional rings 46 having curved slots 47 therein. Bolts 48 project through the slots 47 and also through a segmental hub 49 mounted to turn on the axle within the limit of movement afforded the bolts by means of the slots 47. These segmental hubs 49 are connected by spokes 9 with fenders 10 and mud guards 11, precisely like the fenders 10 and mud guards 11 of the front wheels.

The spokes 9 of the rear fenders 10 are connected by a transverse rod 50 having an arm 51 thereon. This arm 51 is connected by a longitudinal link 52 with an arm 53 on shaft 14, so that when this shaft 14 is turned, all four fenders will be compelled to operate together.

The fenders will, of course, fall by gravity but when shaft 14 is turned to elevate the fenders, all four fenders will be simultaneously raised, and the catch 16 will operate to hold all the fenders in their elevated positions.

The front fenders 10 are connected by a rope netting 54 having a slack chain 55 at its lower edge. To support the upper end of this rope netting which constitutes a scoop to pick up a person or object, a cable 56 is connected to spokes 9 of the fenders, and between its ends is positioned through hangers 57 connected to the vehicle and preferably to the forward ends of the vehicle springs indicated at 60. On this cable 56, sliding hangers 58 are supported and connect to the upper ends of the rope netting. This arrangement of parts allows the front wheels to turn freely in steering, at the same time the fender moves transversely of the vehicle to accommodate itself to the varying positions of the wheels and always in position to pick up a person or object when the wheel fenders fall.

To insure the picking up of a person or object, the ends of the chain 55 are connected to eyes 59 on the lower ends of the front wheel fenders as shown clearly in Fig. 5.

All of the fenders 10 are provided at their lower ends with elastic sections 61. As shown clearly in Figs. 10, 11, and 12, the fenders throughout the greater portion of their length are curved transversely and braced at their lower ends by transversely positioned bars 62. The elastic sections 61 are preferably of leather or some similar material secured to the metal portion of the fender by means of rivets 63, and said sections 61 being elastically supported by means of springs 64. The springs 64 preferably consist of straight bars with their upper ends attached to the metal portions of the fenders by rivets 65, and the intermediate portions of the springs held against the metal sections of the fender by a transverse bar 66 secured at its ends, and between its ends projected across the spring.

The lower ends of all of the springs 64 are free, so that they allow the sections 61 to move rearwardly or in any direction to prevent sharp blows and shocks, yet elastically return the parts to normal position. This is a very desirable construction because of the irregularity in the surfaces over which the vehicle moves. If the parts were rigid and the fender lowered, it would be broken when striking a fixed object such as a cobble stone or rough place in the surface.

With my improved elastic section, the fender can lower to normal operating position and move around objects or over objects, returning quickly to normal position and without any danger of breakage. The springs are, however, stiff enough to move a person or object engaged by the lower end of the fender, so that while they give a certain amount of elasticity to the section, they are not sufficiently weak to prevent the purpose of the fender, namely, to move a person or object struck thereby and prevent the wheels riding over the same.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a four wheeled vehicle, of a fender for each wheel, and means compelling the simultaneous movement of all the fenders, a single device holding all of the fenders normally elevated, and a single device locking all of the fenders in lowered position, substantially as described.

2. The combination with a four wheeled vehicle, of a fender for each wheel, means for elevating all of the fenders simultaneously, and means for normally holding the fenders in elevated position, and a single device for locking all of the fenders in lowered position, substantially as described.

3. The combination with a four wheeled vehicle, of a fender for each wheel, means for elevating all of the fenders simultaneously, a single catch constructed to hold all of the fenders in elevated position, and means for releasing the catch, substantially as described.

4. The combination with a four wheeled vehicle, of a fender for each wheel, means compelling the simultaneous movement of all the fenders, a single device constructed to hold all of the fenders in elevated position, means for limiting the downward movement of the fenders, and means positively locking the fenders in lowered position, substantially as described.

5. The combination with a four wheeled vehicle, of a fender for each wheel, means for elevating all of the fenders, a single device for normally holding the fenders in elevated position, means for limiting the downward movement of the fenders, and means positively locking the fenders in lowered position, substantially as described.

6. The combination with a four wheeled vehicle, of a fender for each wheel, means for elevating all of the fenders simultaneously, a single catch constructed to hold all of the fenders in elevated position, means for releasing the catch, means for limiting the downward movement of the fenders, and means positively locking the fenders in lowered position, substantially as described.

7. The combination with a vehicle, of wheel fenders mounted on the axle stubs and adapted to move in front of the wheels, means normally holding the fenders in elevated position, and a pivoted catch positively locking the fenders in lowered position, substantially as described.

8. The combination with a vehicle, of wheel fenders mounted to move in front of the wheels, rotary segmental gears constituting the central rotary supports of the fenders, one of said segments having a notch therein, and a spring catch adapted to ride into said notch and hold the fenders in lowered position, substantially as described.

9. The combination with a vehicle, of wheel fenders mounted to move in front of the wheels, rotary segmental gears constituting the central rotary supports of the fenders, one of said segments having a notch therein, a spring catch adapted to ride into said notch and hold the fenders in lowered position, and a fixed part adapted to be engaged by the fenders when in lowered position to limit the downward movement of the fenders, substantially as described.

10. A wheel fender having a pivotal support concentric with the wheel in front of which the fender is located, said fender being composed of rigid material, an extension of flexible non-metallic material secured to the lower end of the fender, a longitudinally positioned flat spring secured at its upper end to the inner face of the fender, and at its free end located back of the extension, but terminating short of the free end of the extension, substantially as described.

11. A wheel fender having a pivotal support concentric with the wheel in front of which the fender is located, said fender being composed of rigid material, an extension of flexible non-metallic material secured to the lower end of the fender, a longitudinally positioned flat spring secured at its upper end to the inner face of the fender, and at its free end located back of the extension, but terminating short of the free end of the extension, and said fender and extension being curved transversely, substantially as described.

12. A wheel fender having a pivotal support concentric with the wheel in front of which the fender is located, said fender being composed of rigid material, an extension of flexible non-metallic material secured to the lower end of the fender, a longitudinally positioned flat spring secured at its upper end to the inner face of the fender, and at its free end located back of the extension, but terminating short of the free end of the extension, and a bar secured at its ends to the fender and positioned across the spring midway between the ends of the latter, substantially as described.

13. A wheel fender comprising a metal section curved transversely, a transverse brace connecting the sides of the metal section, an extension of flexible material secured to the lower end of the metal fender, a spring secured to the metal fender and lying at its free end back of the extension, and a transverse bar secured to the metal fender and positioned across the intermediate portion of the spring, substantially as described.

14. The combination with a vehicle, fenders on all of the wheels of the vehicle, a single device normally holding the fenders in elevated position, means compelling the fenders to operate simultaneously, means limiting the downward movement of the fenders, and a single device positively locking the fenders in lowered position, substantially as described.

15. The combination with a vehicle, of vertically movable wheel fenders in front of the front wheels of the vehicle, a cable connecting the wheel fenders and between its ends having sliding connection with the vehicle, hangers on said cables, and a flexible scoop fender supported on said hangers and at its lower end connected to the wheel fenders, substantially as described.

16. The combination with a vehicle having front and rear axles, of combination fenders and mud guards mounted to turn on both front and rear axles, a single device normally holding the fenders in elevated position, and means compelling said fenders to fall simultaneously into operative position, substantially as described.

In testimony whereof I have signed my name to this specification in the presence of two subscribing witnesses.

FREDERICK LILLICH.

Witnesses:
 CHAS. E. POTTS,
 M. E. DITTUS.

Copies of this patent may be obtained for five cents each, by addressing the "Commissioner of Patents, Washington, D. C."